United States Patent [19]

Danno et al.

[11] Patent Number: 4,750,598

[45] Date of Patent: Jun. 14, 1988

[54] CONTROL SYSTEM FOR THE THROTTLE VALVE OF A VEHICLE ENGINE

[75] Inventors: Yoshiaki Danno; Takashi Dogahara; Daisuke Sanbayashi; Makoto Shimada, all of Kyoto, Japan

[73] Assignee: Mitsubishi Jidosha Kogyo Kabushiki Kaisha, Tokyo, Japan

[21] Appl. No.: 873,751

[22] Filed: Jun. 12, 1986

[30] Foreign Application Priority Data

Jun. 12, 1985 [JP] Japan .................................. 60-127320
May 2, 1986 [JP] Japan .................................. 61-102807

[51] Int. Cl.$^4$ .............................................. B60K 41/28
[52] U.S. Cl. ................................. 192/0.058; 192/0.09; 192/1.2; 74/857; 74/859; 123/340
[58] Field of Search ............... 192/0.046, 0.058, 0.09, 192/0.092, 0.052, 3 M; 74/846, 856, 857, 859, 865, 866; 123/146, 480, 339, 179 G, 333, 340

[56] References Cited

U.S. PATENT DOCUMENTS

| | | | |
|---|---|---|---|
| 4,254,844 | 3/1981 | Collonia ...................... | 192/0.058 X |
| 4,485,443 | 11/1984 | Knodler et al. ............. | 192/0.033 X |
| 4,507,986 | 4/1985 | Okamura et al. ............ | 74/859 X |
| 4,515,040 | 5/1985 | Takeuchi et al. ........... | 74/859 X |
| 4,515,041 | 5/1985 | Frank et al. ................. | 74/857 X |
| 4,580,465 | 4/1986 | Omitsu ........................ | 74/859 X |
| 4,594,669 | 6/1986 | Hosaka ........................ | 74/857 X |
| 4,598,611 | 7/1986 | Frank .......................... | 74/857 X |

Primary Examiner—Rodney H. Bonck
Assistant Examiner—Richard M. Lorence
Attorney, Agent, or Firm—Schwartz & Weinrieb

[57] ABSTRACT

A vehicle engine control device includes an operation-degree detecting device for detecting the degree of each operation of a manually operated member effected to control the output of the engine via a throttle valve actuator and a throttle valve; a target acceleration setting device for generating a target acceleration signal corresponding to the degree of the operation of the manually operated member; an acceleration detecting device for detecting each operative acceleration of the vehicle; and a control signal outputting device for comparing the target acceleration signal, which has been generated from the target acceleration setting device, with the detection results from the accelerating detecting device and then outputting a control signal to the actuator so as to control the degree to which the throttle valve is opened in such a way that the operative acceleration of the vehicle is controlled to the target acceleration.

21 Claims, 16 Drawing Sheets

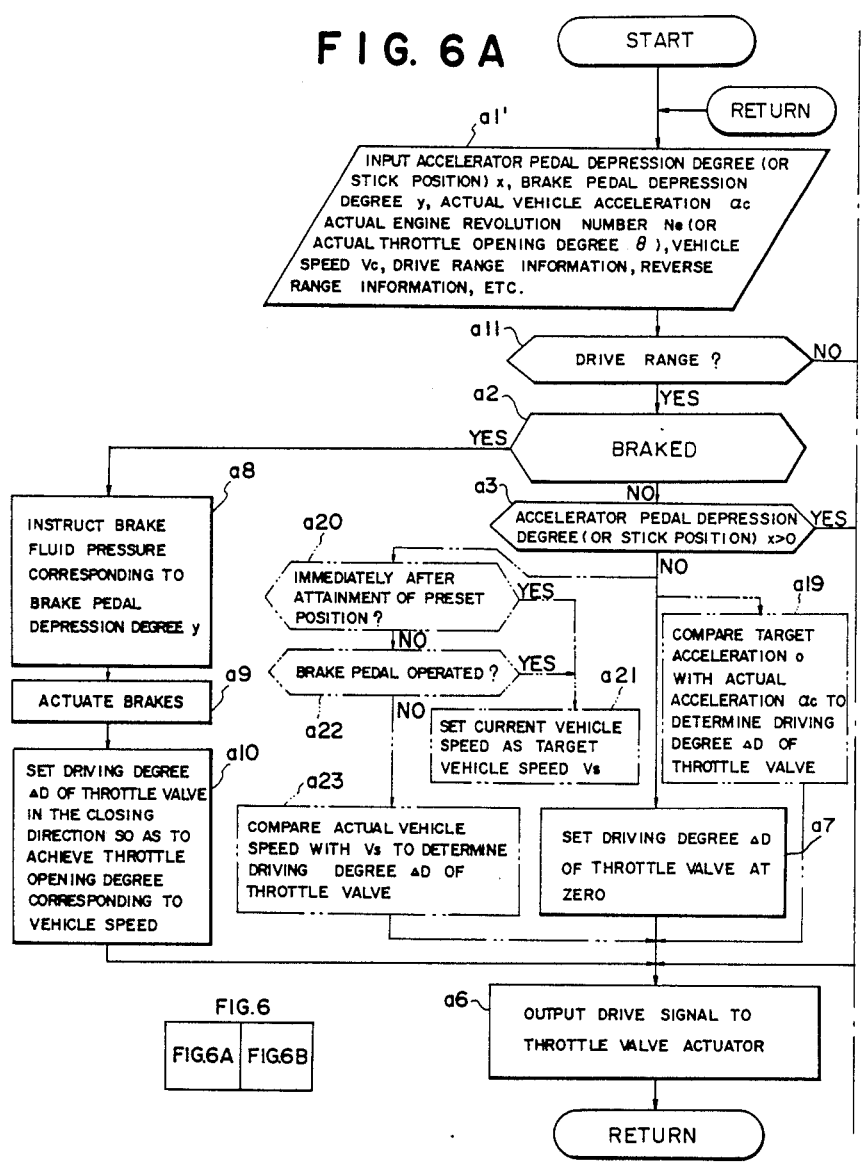

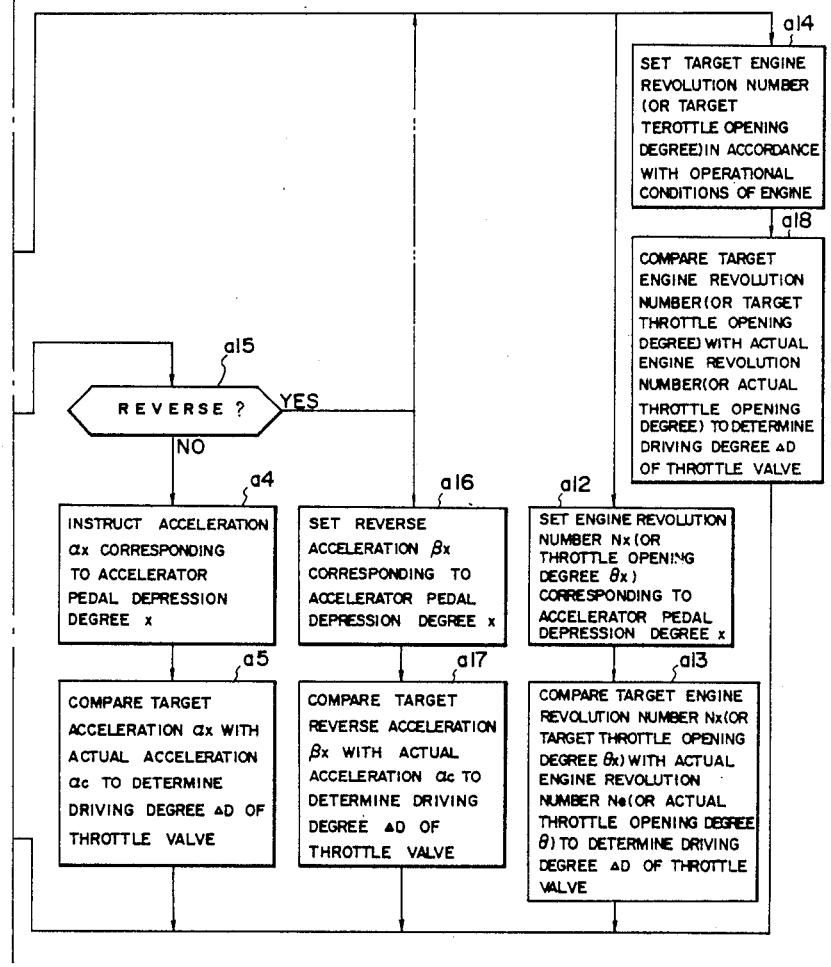

CONTROL SYSTEM FOR THE THROTTLE VALVE OF A VEHICLE ENGINE

BACKGROUND OF THE INVENTION (1) Field of the Invention

This invention relates to a control device for a vehicle engine which is equipped with an output-controlling throttle valve in the intake passage thereof.

(2) Description of the Prior Art

A throttle valve interposed in the intake passage of an engine is conventionally driven by means of a wire connected to the accelerator pedal.

Throttle valve controlling devices of such a conventional direct-coupled and direct-drive type (mechanical linkage type) as mentioned above are however accompanied by such problems as poor responsiveness due to play in their wires and a poor accelerator pedal feeling due to twisting, corrosion and the like of their wires.

On the other hand, it has been proposed to actuate a throttle valve by using the position of its associated accelerator pedal as an input signal as described in U.S. Pat. No. 4,519,360.

In each of these prior art techniques, however the degree to which the throttle valve is opened is nevertheless designed to correspond directly to the degree to which its associated accelerator pedal is depressed, thereby failing to improve the drivability of the vehicle and the like to any sufficient extent.

SUMMARY OF THE INVENTION

With the foregoing in view, the present invention has as its primary objective the provision of a controlling device for a vehicle engine, which can improve the drivability of the vehicle by controlling the degree to which the throttle valve is opened in accordance with the state of operation of a manually-operated member, such as, for example, the degree to which the accelerator pedal is depressed.

In accordance with a primary aspect of this invention, there is thus provided a control device for an engine adapted to be mounted on a vehicle in order to output power for driving the vehicle, the engine including a throttle valve interposed in the intake passage of the engine and an actuator for actuating the throttle valve by means of a manually-operated member so as to control the degree to which the throttle valve is opened and hence the output of the engine, comprising:

operation-degree detecting means for detecting the degree of each operation of the manually-operated member;

target acceleration setting means for receiving the results of the detection from the operation-degree detecting means and generating a target acceleration signal corresponding to the degree of the operation of the manually-operated member;

acceleration detecting means for detecting the actual operative acceleration of the vehicle; and control signal outputting means for comparing the target acceleration signal, which has been generated from the target acceleration setting means, with the detection results from the acceleration detecting means and then outputting a control signal to the actuator so as to control the degree to which the throttle valve is opened in such a way that the operative acceleration of the vehicle is made to respond to the target acceleration.

According to the vehicle engine control device of this invention, the degree to which the throttle valve is opened is controlled in relation to the acceleration of the vehicle by the control signal fed from the control signal outputting means to the actuator, thereby making it possible to control the acceleration of the vehicle in accordance with the target value.

BRIEF DESCRIPTION OF THE DRAWINGS

The above and other objects, features and advantages of the present invention will become apparent from the following description and the appended claims, taken in conjunction with the accompanying drawings, wherein:

FIGS. 6A and 6B are left and right halves, respectively, of a flow chart showing the manner of control by the vehicle engine control device of the third embodiment;

DETAILED DESCRIPTION OF THE INVENTION AND PREFERRED EMBODIMENTS

Figure 1:
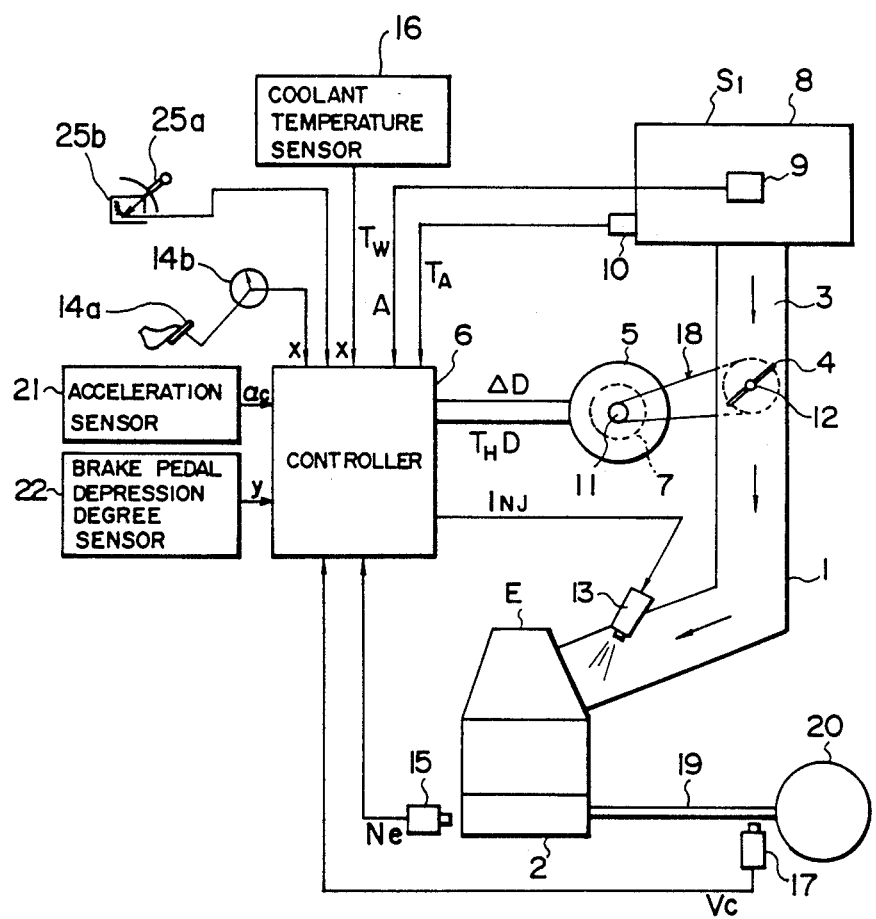
FIG. 1 is a simplified block diagram of the overall construction of a vehicle engine control device according to the first or second embodiment of this invention.

Reference is first made to FIG. 1, in which the first embodiment of this invention is depicted. There is provided an intake passage 1 which is in communication with each combustion chamber of a vehicle engine E equipped with a transmission 2. The intake passage 1 communicating with each of the engine cylinders is connected to a surge tank (not illustrated) which comprises an intake system $S_1$. The surge tank communicates with an upstream-side intake passage 3.

A throttle valve 4 is interposed in the upstream-side intake passage 3. The degree to which the throttle valve 4 opens is controlled by an electric motor 5 as an actuator by means of a pulley mechanism 18 interposed between shafts 11 and 12.

The electric motor 5 is wired in such a way that it receives control signals from a controller (microcomputer) 6. The degree to which the electric motor 5 is driven is detected by a motor position sensor 7 as an opening-degree detecting means. Based on the detection results from the motor position sensor 7, the controller 6 can indirectly determine the degree to which the throttle valve 4 is opened. The controller 6 is equipped with a CPU, RAM, ROM and input/output device. An air cleaner 8 is disposed within the upstream-side intake passage 3 at a location upstream of the throttle valve 4. The air cleaner 8 is provided with a Karman vortex airflow sensor 9 and a suction air temperature sensor 10.

In addition, an injector 13 which is adapted to inject fuel, is also provided in the intake passage 1 at a location near the combustion chambers of the engine E.

As described above, the intake system $S_1$ is composed of the intake passage 1, surge tank (not shown), upstream-side intake passage 3, throttle valve 4, electric motor 5, motor position sensor 7, air cleaner 8, Karman vortex airflow sensor 9, suction air temperature sensor 10 and injector 13.

The controller 6 is connected respectively to an accelerator pedal depression degree sensor (accelerator pedal position sensor) 14b which serves as an operation-degree detecting means for detecting the degree to which an accelerator pedal 14a is depressed, pedal 14a being provided as a manually-operated member near the driver's seat of a vehicle, an engine revolution number sensor 15 for detecting the number of engine revolutions (that is, the engine rotational speed), a coolant temperature sensor 16 for detecting the temperature of the cooling water of the Engine E, a vehicle speed sensor 17, an idling switch for detecting that the throttle valve 4 is in an idling position, an acceleration sensor (G sensor) 21 for detecting each acceleration of the vehicle (especially, accelerations in both the forward and rearward directions), and a brake pedal depression degree sensor 22 which serves as a brake operation detecting means for detecting the degree to which a brake pedal or a brake operating member is depressed (or for detecting whether or not the brake pedal is depressed).

Figure 8:
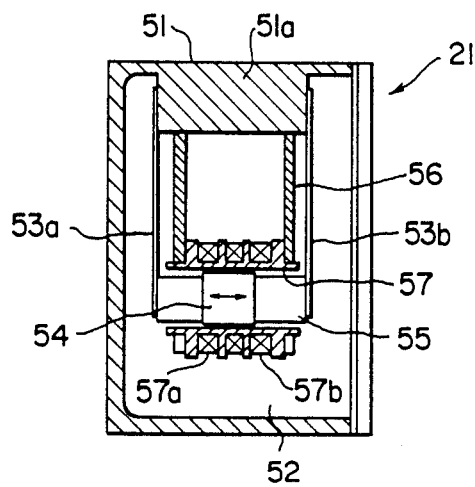
FIG. 8 is a cross-sectional view of an acceleration sensor employed in each of the preceding embodiments of this invention.
Figure 9:
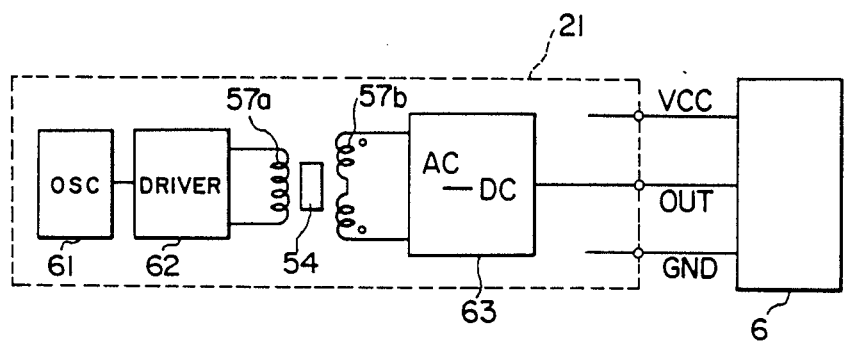
FIG. 9 is an output circuit diagram of the acceleration sensor.
Figure 10:
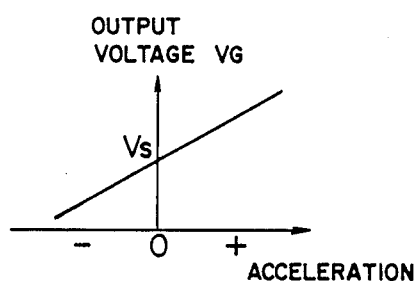
FIG. 10 is a graphical representation of the output voltage of the acceleration sensor as a function of acceleration.

Referring now to FIG. 8 through FIG. 10, the acceleration sensor 21 is described in detail. The acceleration sensor 21 is of the differential transformer type. In FIG. 8, numeral 51 indicates the main body of the sensor. A shock-absorbing oil 52 fills the interior of the sensor main body 51. Springs 53a,53b are attached to a projection 51a which extends inwardly from the inner wall of the main body 51. A core 54 is suspended between the lower extremities of the springs 53a,53b by means of support members 55. Designated at numeral 56 is a printed circuit board which is attached at the upper edge thereof to the projection 51a and at a lower end portion thereof to a coil assembly 57. A primary coil 57a and a secondary coil 57b are wound on the coil assembly 57. The acceleration sensor 21 is mounted on a vehicle body in such a direction that the arrow shown in FIG. 8 coincides with the front-to-rear direction (that is, the operative directions) of the vehicle.

Figure 11:
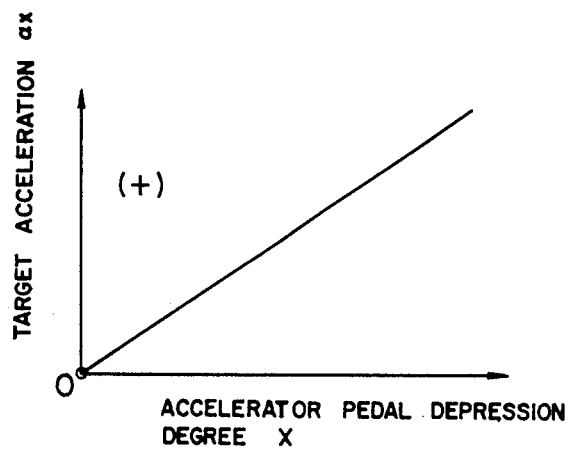
FIGS. 11–16 are diagrams showing various feedback target values as a function of the degree of depression of an accelerator pedal as a manually-operated member.

FIG. 9 is a diagram depicting an electrically equivalent circuit of the differential transformer type acceleration sensor 21 depicted in FIG. 8. Namely, an oscillator 61, a driver 62 and an AC/DC converter 63 are mounted on the printed circuit board 56. When the core 54 is displaced in either the forward or rearward direction owing to an acceleration (G) of the vehicle in the reversely corresponding direction, the output voltage VG of the converter 63 varies in accordance with the degree of its displacement. Here, FIG. 10 shows an exemplary output voltage VG characteristic of the accelerator sensor 21. As depicted in the drawing, the voltage VG increases in proportion to the acceleration G. The controller 6 stores, in the ROM, a program which comprises the target acceleration setting means. As shown in FIG. 11, the program stores a target acceleration $\alpha_x$ in relation to the corresponding degree to which the accelerator is opened or depressed (accelerator pedal depression degree) x and such is converted to an electrical signal by means of the accelerator pedal depression degree sensor 14b.

An additional program is also stored in the ROM of the controller 6 to comprise the control signal outputting means. This program compares an actual acceleration $\alpha_c$ as detected by the acceleration sensor 21 with the above-mentioned target acceleration $\alpha_x$ and outputs a feedback control signal to the electric motor 5 so as to bring the actual acceleration $\alpha_c$ of the vehicle into conformity with the target acceleration $\alpha_x$.

Besides the throttle valve controlling means, the controller 6 also functions as a fuel injection rate controlling means and an ignition timing controlling means. A detailed description of these additional functions is however omitted herefrom because the fuel injection control and ignition timing control have been known to date.

In FIG. 1, numerals 19 and 20 schematically indicate a propeller shaft and wheel respectively.

Figure 2:
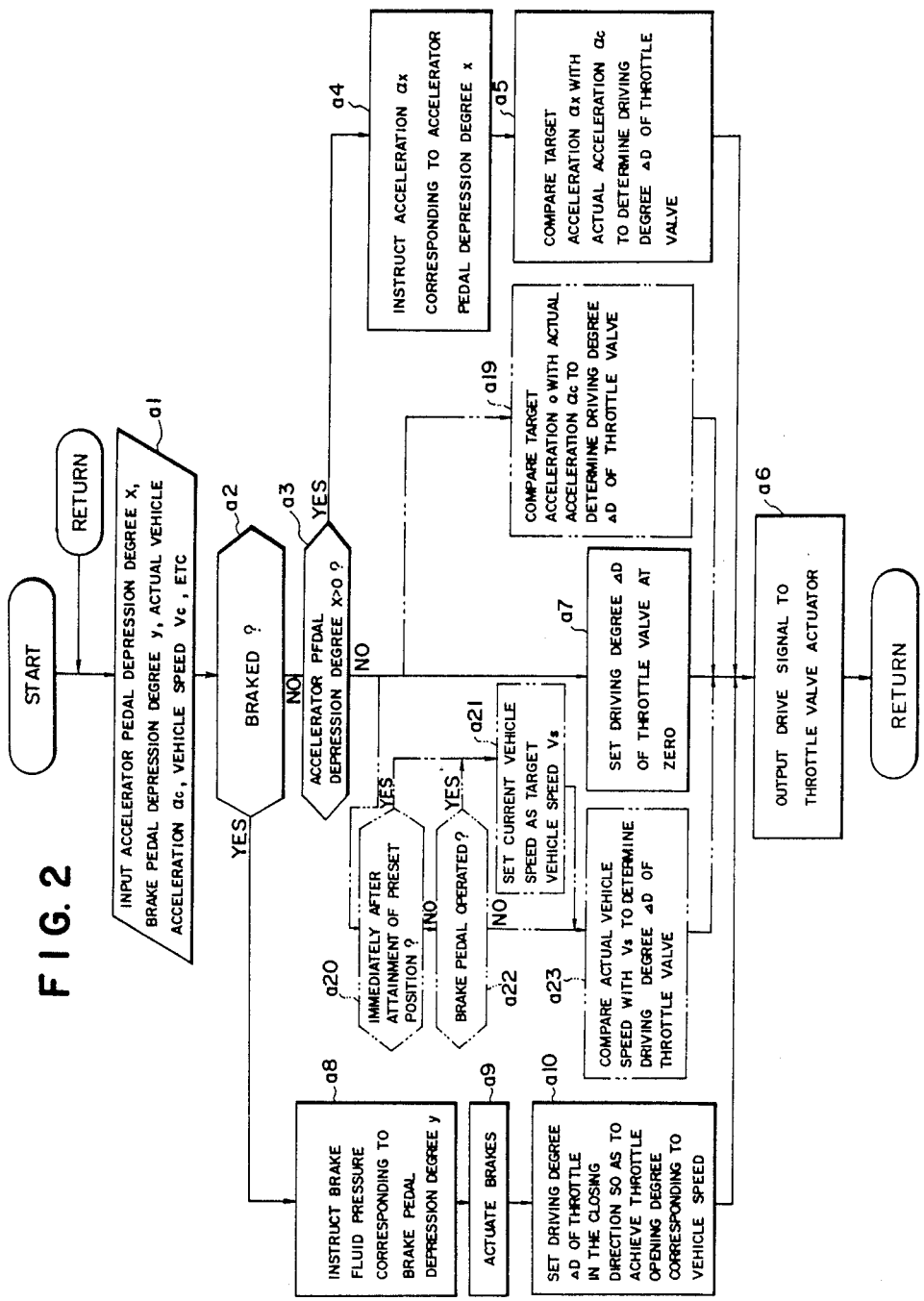
FIG. 2 is a flow chart showing the manner of control by the vehicle engine control device of the first embodiment.

In the first embodiment of this invention, the control device includes the above-described components and while using the controller 6 as a central device, performs control functions in accordance with the flow chart depicted in FIG. 2. In FIG. 2, detection signals, which correspond respectively to an accelerator pedal depression degree x detected by the accelerator pedal position sensor 14b, a brake pedal depression degree y detected by the brake pedal depression sensor 22, an actual acceleration $\alpha_c$ detected by the acceleration sensor 21 and a vehicle speed $V_c$ detected by the vehicle speed sensor 17, are initially input into the controller (Step a1) so as to determine whether or not the brake pedal is in a depressed position (Step a2).

When the brake pedal is not in any depressed position, another judgment is made to determine whether or not the accelerator pedal 14a is depressed (Step a3). If the accelerator pedal 14a is in a depressed position, the acceleration $\alpha_x$ corresponding to the accelerator pedal depression degree x is employed as a target acceleration and the actual acceleration $\alpha_c$ is compared with the target acceleration $\alpha_x$ in Steps a4, a5. Based on the value of the comparison (that is, the, difference), there is determined a driving degree $\Delta D$ of the throttle valve 4 which is required to make the actual acceleration $\alpha_c$ equal to the target acceleration $\alpha_x$ (Step a5). A signal corresponding to the driving degree is then output to the electric motor 5 so as to feedback control the throttle valve 4 such that the target acceleration $\alpha_x$ is achieved (Step a6).

In the above-described manner, the accelerator pedal depression degree x establishes the target acceleration. That is, Step a4 comprises a target acceleration setting means while Steps a5 and a6 constitute control signal outputting means.

When the accelerator pedal 14a is not depressed, the "NO" route is followed from Step a3 and in Step a7, the driving degree $\Delta D$ of the throttle valve 4 is set at zero so that an instruction is made to maintain the current throttle-open level. The instruction is then output to the electric motor 5 in Step a6. That is, Steps a7 and a6 make up a throttle opening degree fixing means.

When the brake pedal is in a depressed position, a brake fluid pressure corresponding to the depression degree y of the brake pedal is achieved so as to operate the brakes (Steps a8, a9).

The driving degree $\Delta D$ is then set in the closing direction so that the throttle valve 4 is completely closed or has an opening degree corresponding to the vehicle speed (Step a10). The driving degree $\Delta D$ is thereafter output to the electric motor 5 in Step a6. That is, a braking-time signal outputting means corresponds to Steps a2 and a10.

In the above-described manner, the electric motor 5 is driven so as to achieve each of the aforenoted throttle valve driving degrees $\Delta D$.

Figure 3:
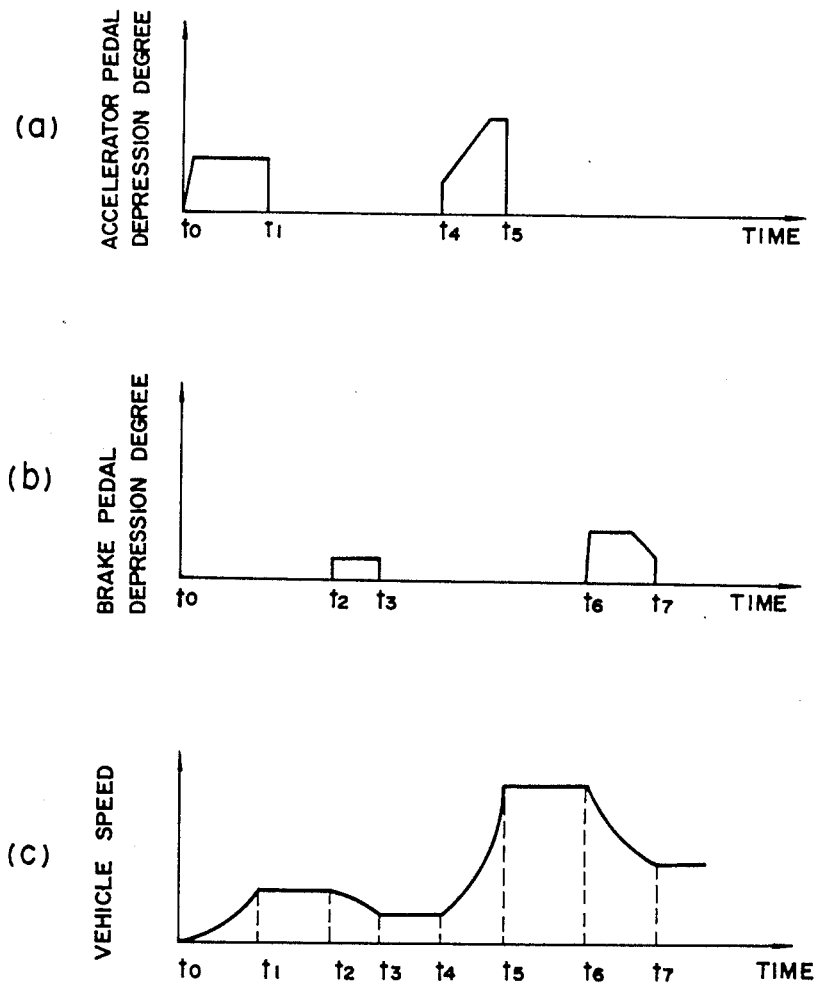
FIGS. 3(a), 3(b) and 3(c) diagrammatically illustrate the operation of the vehicle engine control device of the first embodiment.

According to the first embodiment, the acceleration control is not performed while the fully-depressed (that is, opened) position of the accelerator pedal 14a is used as a preset position. By maintaining (fixing) the throttle open at the level attained immediately before the fully-depressed position of the accelerator pedal has been achieved, the vehicle speed increases as shown in FIG. 3(c) when the accelerator pedal 14a is depressed as illustrated in FIG. 3(a) (see the time span $t_0$-$t_1$ and the time span $t_4$-$t_5$) whereas the vehicle speed decreases as depicted in FIG. 3(c) when the brake pedal is depressed as shown in FIG. 3(b) (see the time span $t_2$-$t_3$ and the time span $t_6$-$t_7$).

That is, the deceleration is effected by the brake pedal.

When neither the accelerator pedal 14a nor the brake pedal is depressed (that is, for the time span $t_1$-$t_2$ and the time span $t_5$-$t_6$), the vehicle speed becomes substantially constant as shown in FIG. 3(c) so that the autocruising function, which permits operation at a constant speed, is exhibited.

In addition, a branch step may be provided between Step a2 and Step a8 so as to detect the vehicle speed and brake pedal depression degree y. The control device may be constructed in such a way that while operating at a predetermined vehicle speed or slower, the throttle is brought to the full closure position so as to create the state of engine braking when the depression degree y is smaller than a predetermined depression degree $y_o$ whereas the throttle is brought to the full closure position and the brake mechanism is also operated when the depression degree y is either equal to or greater than the predetermined depression degree $y_o$. This construction may be modified, for example, in such a way that while operating at the predetermined vehicle speed or faster, the throttle valve is driven in the closing direction so as to lower the vehicle speed when the depression degree y is smaller than a predetermined depression degree $y_1$, the state of engine braking is created when the depression degree y is either equal to or greater than the depression degree $y_1$ but smaller than another predetermined depression degree $y_2$ ($>y_1$), and the throttle is brought to the full closure position and the brake mechanism is also operated when the depression degree y is either equal to or greater than the predetermined depression degree $y_2$.

Steps a8 and a9 may however be omitted in the above-described first embodiment when the brake mechanism is operated mechanically in response to the depression of the brake pedal.

Figure 4:
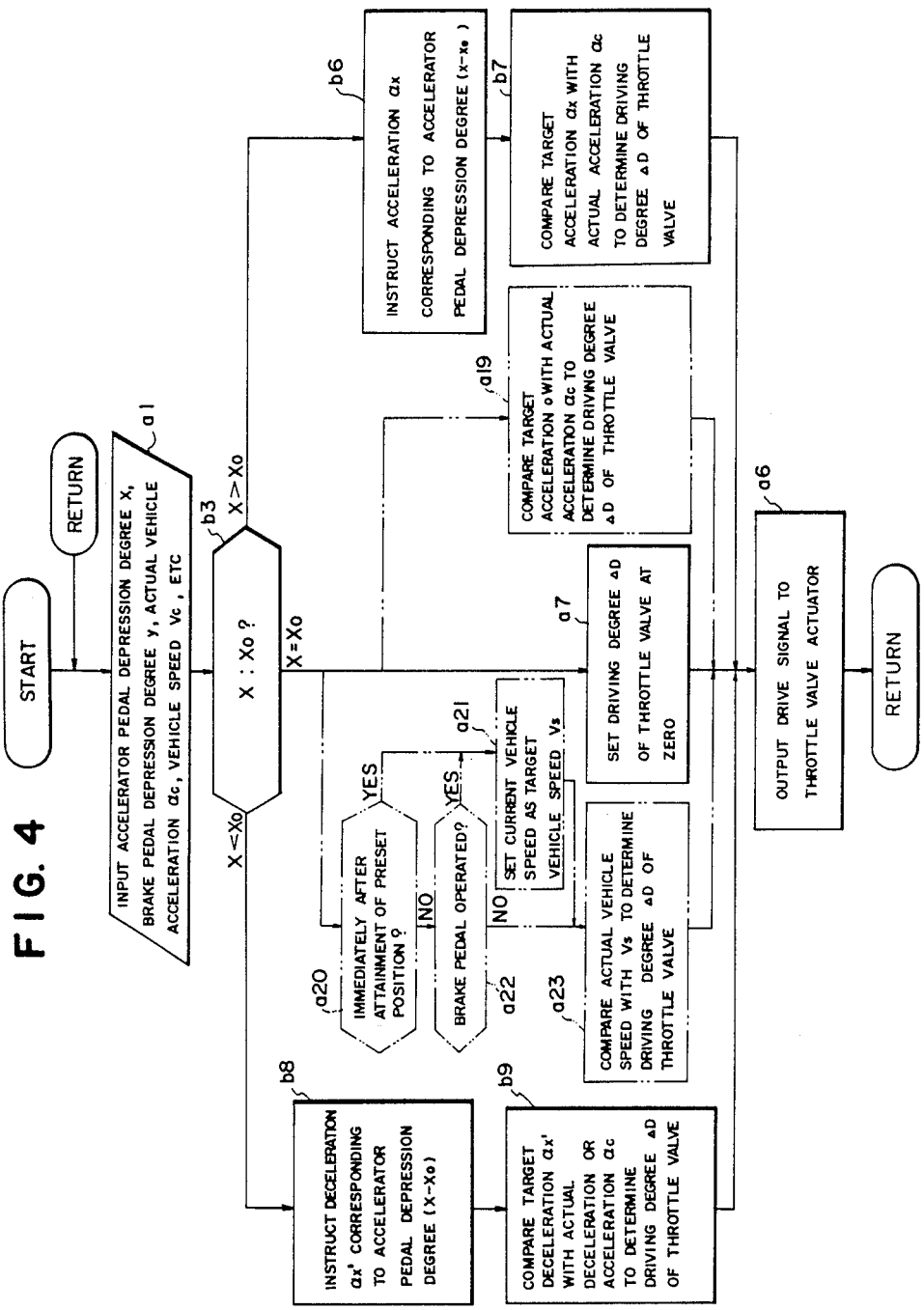
FIG. 4 is a flow chart showing the manner of control by the vehicle engine control device of the second embodiment.

Reference is next made to FIG. 4, in which the second embodiment of this invention is illustrated. The control device of the second embodiment is substantially the same as that of the first embodiment, as far as its hardware is concerned. The second embodiment is however different from the first embodiment in the manner of processing at the controller 6, or in other words, in terms of its programs. In FIG. 4, the same reference symbols as those employed in FIG. 1 through FIG. 3 indicate substantially the same steps or hardware units.

In the second embodiment, an accelerator pedal depression degree $x_o$ detected by means of the accelerator position sensor 14b when the accelerator pedal 14a is substantially at the midpoint of its overall stroke is employed at a preset position. A program which comprises the target acceleration setting means is designed to correspond to the zero acceleration demand, or in other words, to maintain the throttle in its immediately preceding state in order to maintain the current vehicle speed.

In the second embodiment, the depression degree x of the accelerator pedal 14a is determined in Step b3 after information concerning operational conditions has been input in Step a1. When the accelerator pedal 14a is in a position depressed to the preset positon $x_o$ (that is, to the midpoint of the overall stroke in this embodiment), the vehicle is allowed to move at a constant speed (Step a7). When the accelerator pedal 14a is depressed further from the depressed position corresponding to the constant-speed operating state, an acceleration signal $\alpha_x$ corresponding to the difference (x-$x_o$) in depression (or operation) is generated (Step b6). In Step b7, the target acceleration $\alpha_x$ is compared with the actual acceleration $\alpha_c$ so as to determine the driving degree $\Delta D$ of the throttle valve 4. By performing the process of Step a6, the vehicle is therefore accelerated. When the degree of depression (namely, the degree of operation) is reduced from the depressed (operated) position $x_o$ corresponding to the constant-speed operating state, a deceleration signal $\alpha_x$, is generated corresponding to the difference (x-$x_o$) in depression (operation), and in Steps b8 and b9, the target deceleration $\alpha_x$, is compared with the actual deceleration (acceleration) $\alpha_c$ so as to determine the driving degree $\Delta D$ of the throttle valve 4. By performing the process of Step a6, the vehicle is therefore decelerated.

Figure 12:
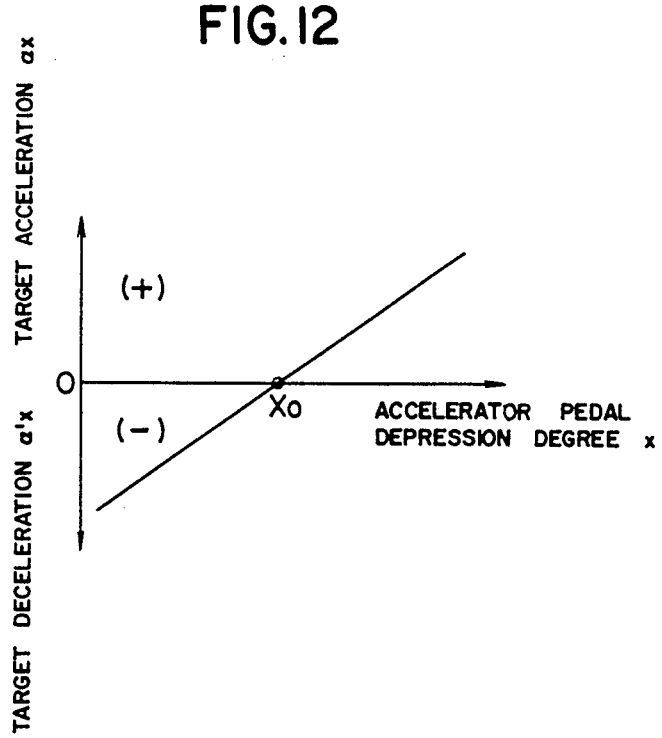

Similar to the first embodiment, the acceleration or deceleration is also feedback controlled by means of the acceleration sensor 21. Incidentally, the relationship between the target acceleration $\alpha_x$ and target deceleration $\alpha_x$, and the depression degree x of the accelerator pedal is diagrammatically depicted in FIG. 12.

When a desired speed is achieved, the accelerator pedal 14a is depressed to the point of zero acceleration demand, namely, to the preset position so that the vehicle speed is maintained constant.

It is also feasible to control the system in such a manner that when the brake pedal is depressed, the degree to which the throttle is opened is brought to zero (full closure) or to an open position corresponding to the vehicle speed, thereby terminating acceleration.

As other advantages, the control device of the second embodiment can bring about substantially the same advantages as the control device of the first embodiment.

Other embodiments of this invention will hereinafter be described.

The third and fourth embodiments, which will be described below, have additional features over the above-described first and second embodiments in that the above-described throttle valve control by means of detected vehicle acceleration is replaced by another control when the engine and vehicle are disengaged, that is, when vehicle-driving power is not transmitted from the engine to the vehicle means of the clutch, transmission or the like.

Figure 5:
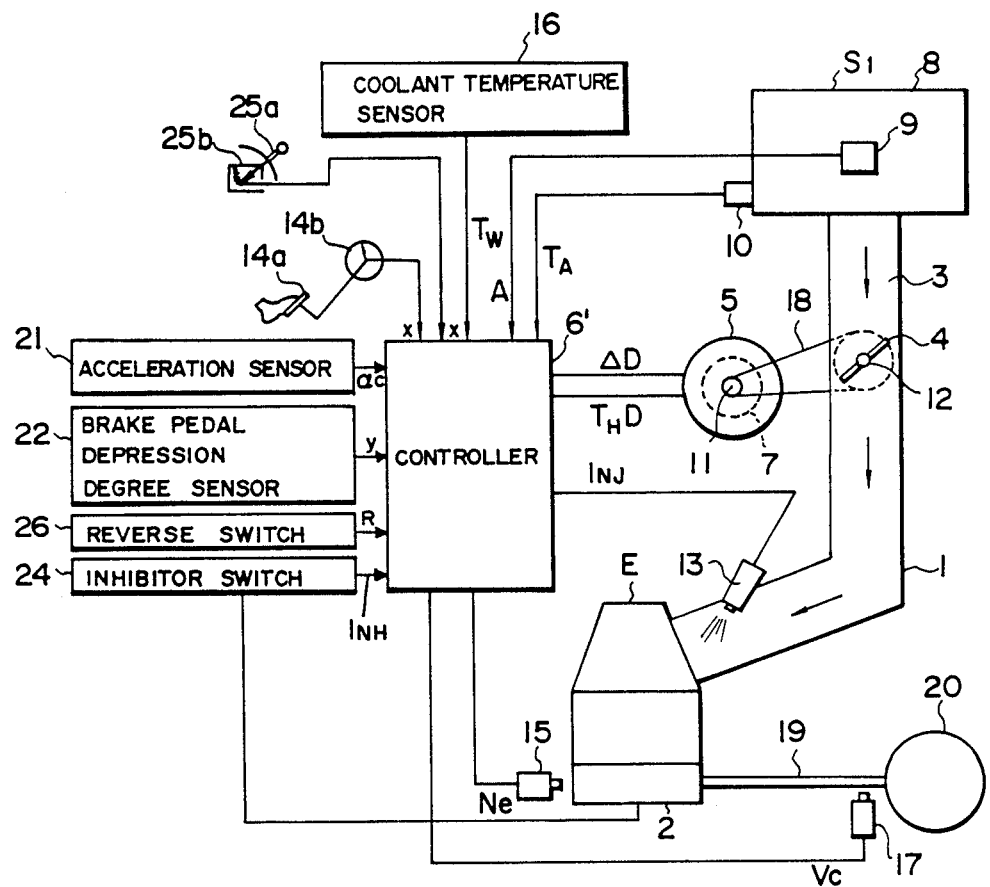
FIG. 5 is a simplified block diagram of the overall construction of a vehicle engine control device according to the third or fourth embodiment of this invention.
Figure 5A:
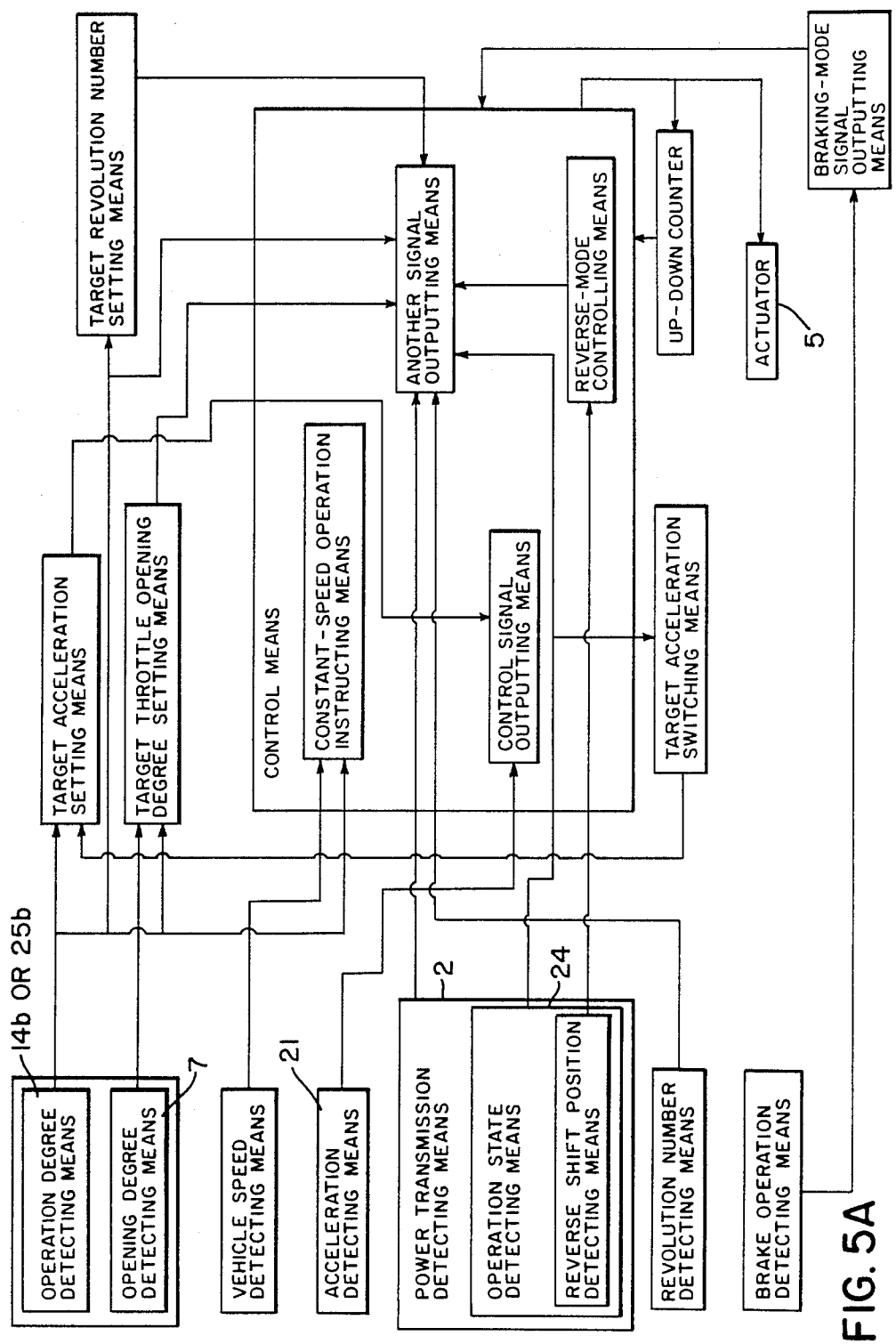
FIG. 5A is a schematic diagram of the various control means comprising the controller 6' of FIG. 5, and some of the operative components of the overall control system of the present invention with which the controller 6' is operatively associated.

FIG. 5 is a schematic illustration of the overall construction of a control device according to the third or fourth embodiment of this invention. In FIG. 5, elements of structure identical or similar to their corresponding elements in FIG. 1 are identified by the same reference numerals. A transmission 2 shown in FIG. 5 is a discontinuously variable automatic transmission (that is, an automatic transmission with a stepped gear-ratio) which serves as a power transmission controlling means.

The third and fourth embodiments shown in FIG. 5 are different from those illustrated in FIG. 1 in that a controller 6' is input with detection results from an inhibitor switch 24, which detects whether the shift position of the transmission 2 is in the neutral position or a drive gear position, and detection results from a reverse switch 26 which detects if the shift position of the transmission 2 is in the reverse position; and additional processing is performed at the controller 6' in accordance with the outputs from the inhibitor switch 24 and reverse switch 26.

The inhibitor switch 24 is provided so as to permit operation of the starter motor of the engine when the shift position of the transmission 2 is in a non-gear position (neutral range) [that is, the neutral(N) position or parking(P) position], or in other words, when the vehicle-driving power of the engine is not transmissible to the vehicle, and to prohibit operation of the starter motor when the shift position is in a gear position [that is, the drive(D) position, low-speed(1) position, second-speed(2) position or reverse(R) position] and the vehicle-driving power of the engine is transmissible to the vehicle. In the third and fourth embodiments, the inhibitor switch 24 constitutes an operational state detecting means which serves to control the opening degree of the throttle valve 4.

On the other hand, the reverse switch 26 is provided so as to illuminate a reverse made lamp which is in turn provided to notify the driver of a following or trailing vehicle that the transmission of the vehicle is in reverse. In the third and fourth embodiments, the reverse switch 26 also constitutes a reverse shift position detecting means for controlling the opening degree of the throttle valve 4.

Processing at the controller 6' in accordance with the third embodiment of this invention will next be described with reference to FIG. 6.

The processing shown in FIG. 6 is basically the same as that performed by the first embodiment shown in FIG. 2 except for the addition of processing pertaining to the on/off or engagement/disengagement state between the vehicle and the engine. In FIG. 6, steps substantially the same as those depicted in FIG. 2 are hence designated by the same step numbers, and their description is accordingly omitted herefrom.

Initially, various operational conditions are input in Step a1' in the same manner as in Step a1 in FIG. 2. In addition, detection results from the inhibitor switch 24 are also input in Step a1'.

Figure 13:
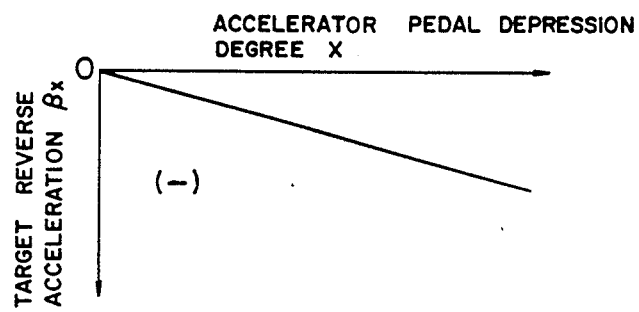

In Step a11, a judgment is then made on the basis of the on/off state of the inhibitor switch 24 to determine whether or not the shift position of the transmission 2 is in a gear position. When the shift position is judged to be in a gear position, the same processing as that performed by the first embodiment in FIG. 2 is basically carried out in Step a2 and its subsequent steps. When "YES", however, is judged in Step a3, Step a15 is provided subsequent to Step a3. In Step a15, there is judged whether or not the shift position of the transmission 2 is in a reverse position. When the judgement is negative, the processing proceeds to Step a4 in the same manner as the processing shown in FIG. 2. When the shift position is found to be in the reverse position on the other hand, a target acceleration $\beta_x$ is set based on the accelerator pedal depression degree x in Step a16 so that the vehicle is driven in the rearward direction following the characteristics shown in FIG. 13. In Step a17, the target reverse acceleration $\beta_x$ is compared with the actual acceleration $\alpha_c$ and based on the value of this comparison (that is, the difference), the driving degree $\Delta D$ of the throttle valve 4 is determined in such a way that the actual acceleration $\alpha_c$ becomes equal to the target acceleration $\beta_x$. A signal corresponding to the driving degree $\Delta D$ is then output to the electric motor 5 in Step a6.

When the shift position is judged to be in a non-gear position in Step a11 on the other hand, a control is effected by making the accelerator pedal depression degree correspond to the engine speed (or the degree to which the throttle is open) as shown in Steps a12, a13 and a6. Here, Step a11 constitutes a control means.

Figure 15:
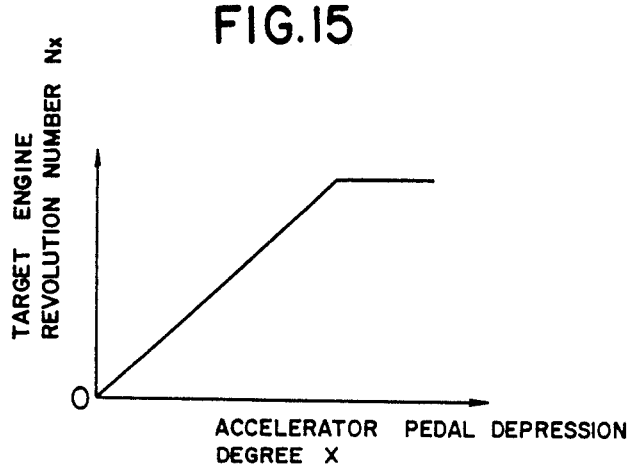
Figure 16:
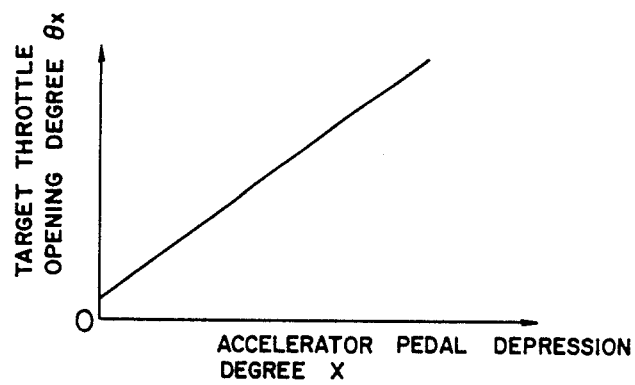

That is, as illustrated in FIG. 15 (or FIG. 16), the engine speed or an engine revolution number Nx (or throttle opening degree $\theta_x$) corresponding to the accelerator pedal depression degree x is read out from the target engine revolution number setting means (or throttle opening degree setting means) of the controller 6' in order to use the engine revolution number Nx (or throttle opening degree $\theta_x$) as a target engine revolution number Nx (or target throttle opening degree $\theta_x$) [Step a12]. Thereafter, the difference between the target engine revolution number Nx and the actual engine revolution number Ne (or between the target throttle opening degree $\theta_x$ and the actual throttle opening degree $\theta$) is obtained so as to determine a driving degree $\Delta D$ of the throttle valve 4 which is required to make the actual engine revolution number Ne (or actual throttle opening degree $\theta$) equal to the target engine revolution number Nx (or target throttle opening degree $\theta_x$) [Step a13]. A signal corresponding to the driving degree is output as another signal to the electric motor 5 so as to move the throttle valve 4 to an open position which achieves the target engine revolution number Nx (or target throttle opening degree $\theta_x$). Here, Steps a13 and a6 compromise another signal outputting means.

When the shift position is a non-gear position, the throttle valve 4 is controlled in relation to the engine revolution number or engine speed and the throttle opening degree as described above. The following effects or merits can therefore be achieved. Let it be assumed that even when the transmission is in a non-gear position, the throttle valve 4 is controlled by adjusting the accelerator pedal depression degree x in accordance with the acceleration in the same manner as when the transmission is in an operative gear position. Under this control condition, there is the danger that when the accelerator is depressed to even a small degree, such may cause the engine to operate at an excessively high rate of speed. However, there is in fact no danger that the engine could operate at such an excessively high rate of speed and moreover, a racing operation can be performed in accordance with the degree of operation of the accelerator pedal 14a since the throttle valve 4 is not controlled by the first control signal corresponding to the acceleration but is controlled by another signal corresponding to the engine revolutions or the degree to which the throttle is open in the non-gear position as described above.

Figure 7A:
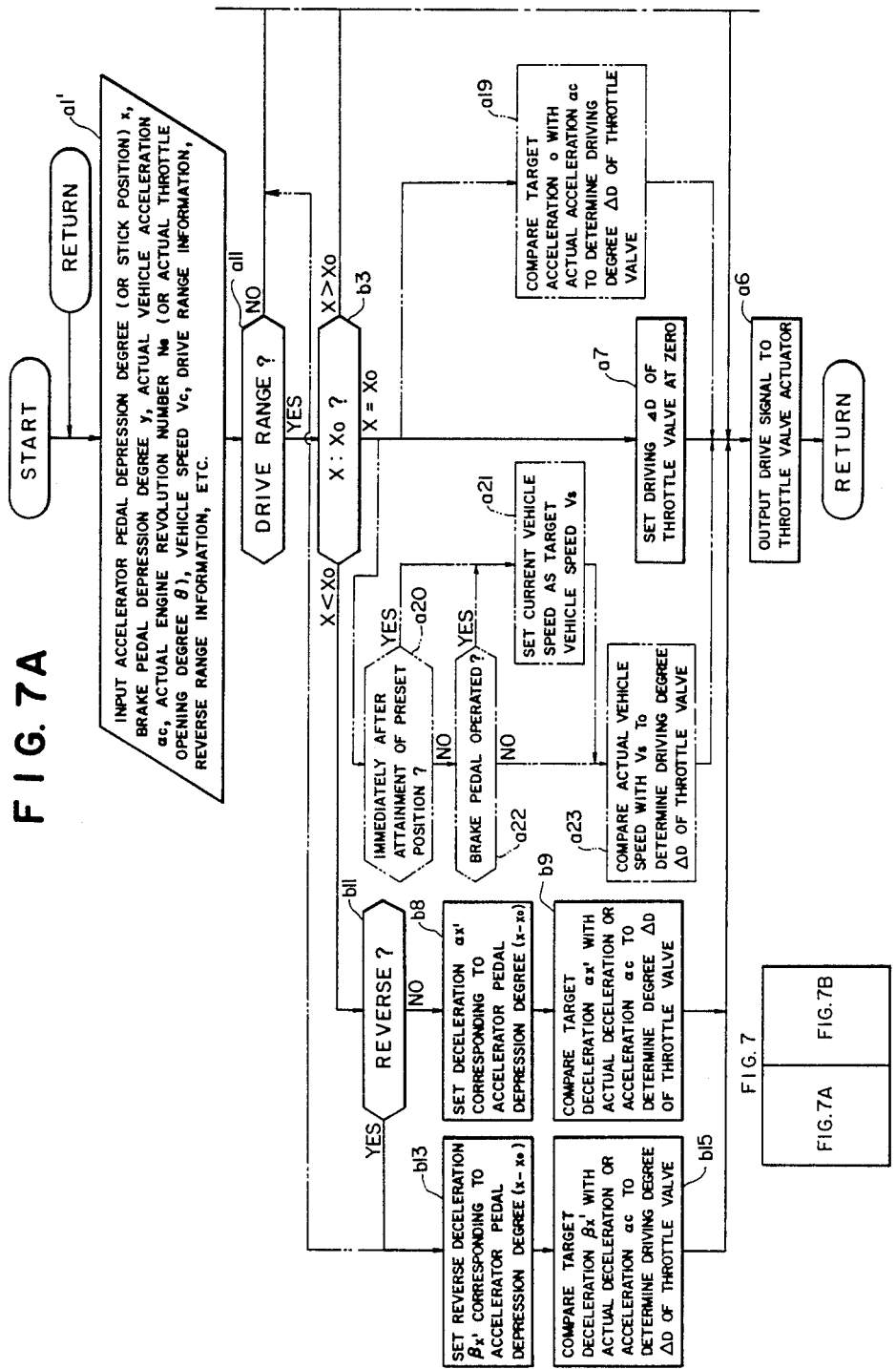
FIGS. 7A and 7B are left and right halves, respectively, of a flow chart showing the manner of control by the vehicle engine control device of the fourth embodiment.
Figure 7B:
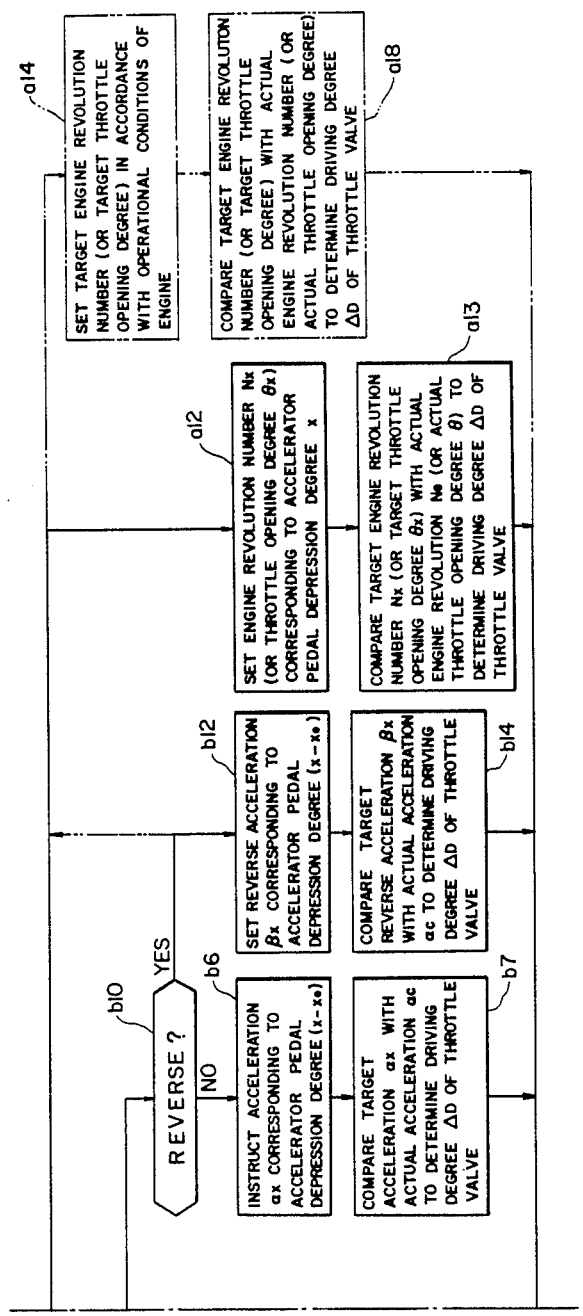
Figure 14:
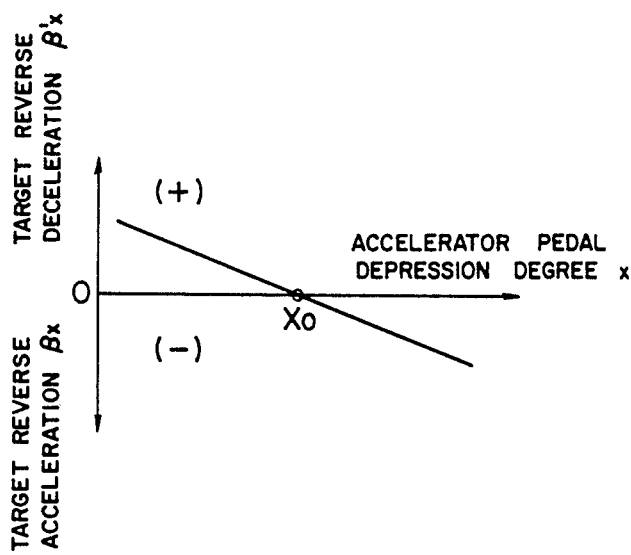

FIG. 7 illustrates the flow chart relating to the fourth embodiment of this invention. The processing by the control device of the fourth embodiment is different from that performed by the control device of the second embodiment, which is shown in FIG. 4, in that the processing is based on the on/off or engagement/disengagement state between the vehicle and engine, that is, the above-described additional feature of the third embodiment has been added. Therefore, the control device of the fourth embodiment can therefore exhibit not only the same effects as the above-described second embodiment but also the same additional effects as the third embodiment because the processing in a non-gear position, namely, when the vehicle is not supplied with any driving power from the engine, has been added as is similar to the third embodiment. In FIG. 7, the same step numbers as those shown in FIG. 4 and FIG. 6 designate steps of the same function as in FIG. 4 and FIG. 6. In the fourth embodiment, it is also judged, similarly to the third embodiment, whether or not the shift position of the transmission 2 is in the reverse position (Step b10 and Step b11). When the shift position of the transmission 2 is judged to be in the reverse position, a target reverse acceleration $\beta_x$ or target reverse deceleration $\beta_x$, is set in Step b12 or b13 respectively. By following the control route from Step b15 to Step a6, the acceleration during actual rearward movement of the vehicle is controlled so as to correspond to a target value. Incidentally, the relationship between the target reverse acceleration $\beta_x$ and target reverse deceleration $\beta_x$, and the degree to which the accelerator pedal is depressed is illustrated in FIG. 14.

In each of the above-described third and fourth embodiments of the invention, the control device has been equipped with the discontinuously variable automatic transmission as the power transmission control means, and the shift position detecting means, which is constituted by the inhibitor switch, as the operational state detecting means for detecting the operation of the power transmission control means. Where a discontinuously variable transmission and clutch are interposed in the power transmission system between the engine and the vehicle, a clutch switch adapted to detect the on/off or engagement/disengagement state of the clutch may be provided as an operational condition detecting means.

Figure 19:
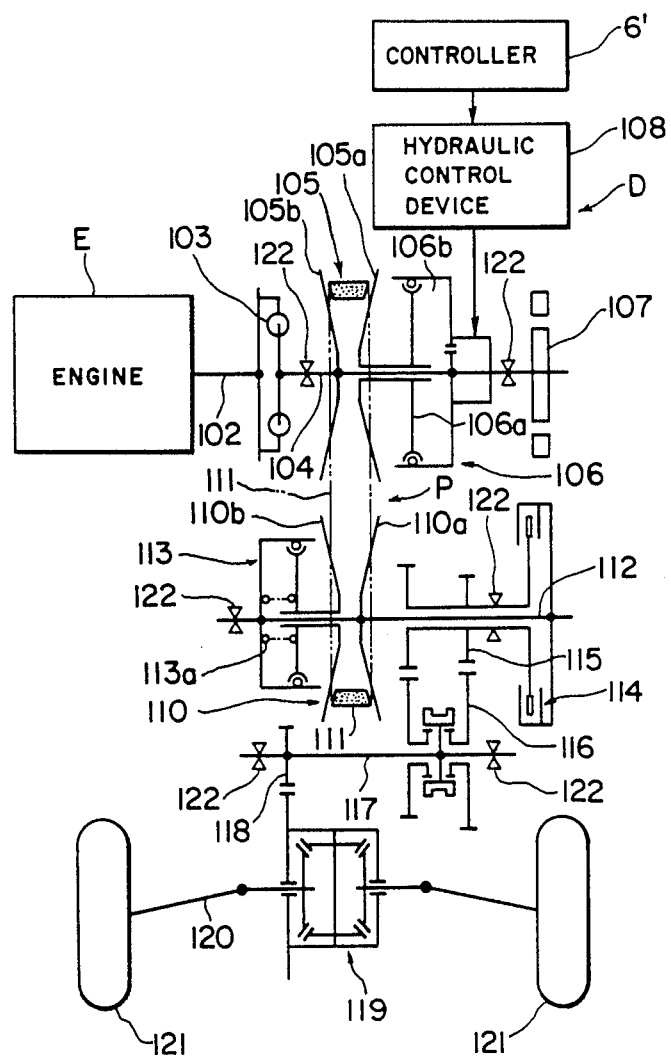
FIG. 19 is a schematic illustration of a continuously variable vehicle transmission useful in a modification of the present invention.

As to a power transmission system equipped with a continuously variable transmission (CVT), reference may be made to FIG. 19, in which a drive shaft 104 is connected to an output shaft 102 of the engine E of the vehicle by means of a long travel damper 103. On the drive shaft 104, there is mounted a first radius variable pulley 105 the effective diameter of which is designed to be variable. To the first variable pulley 105, there are connected a cylinder mechanism 106 comprising a pulley adjustment system D and an oil pump (variable capacity vane pump) 107.

That is, the first radius variable pulley 105 is provided as the driving pulley of a pulley mechanism P.

A lefthand side plate 105b of the first radius variable pulley 105 is fixedly secured on the drive shaft 104, while a righthand side plate 105a of the radius variable pulley 105 is connected by means of splines and their matching keyways to the drive shaft 104 and is also coupled to a piston portion 106a of the cylinder mechanism 106.

A cylinder compartment 106b of the cylinder mechanism 106 is supplied with hydraulic fluid from a hydraulic control device 108 which constitutes a pulley adjustment system D. The supply rate of the hydraulic fluid is controlled by means of a control signal which is fed from the controller 6' to the hydraulic control device 108.

A drive belt 111 extends between the first radius variable pulley 105 and a second radius variable pulley 110. The second radius variable pulley 110 is mounted on a driven shaft (follower shaft) 112.

A lefthand side wall 110b of the second radius variable pulley 110 is connected by means of splines and their matching keyways to the driven shaft 112 and is also coupled to a spring-type responsive mechanism 113. On the other hand, a righthand side plate 110a of the second radius variable pulley 110 is fixedly secured to the driven shaft 112.

In this manner, the second pulley 110 is provided as the driven pulley of the pulley mechanism P.

The driven shaft 112 is connected to wheels 121 by means of a take-off clutch 114 serving as a power transmission control means, gears 115, forward/rearward switching clutch 116, shaft 117, gears 118, differential gear mechanism 119 and axles 120.

The take-off clutch 114 is provided with an unillustrated clutch switch so as to detect the state of operation of the clutch 114, that is, whether or not the power of the engine E is being transmitted to the side of the vehicle body (that is, to the side of the wheels 121) via the clutch 114.

In FIG. 19, numeral 113a indicates a spring while numeral 122 designates a bearing.

Since the continuously variable transmission is constructed as described above, it is possible to continuously vary the speed change ratio. When no hydraulic fluid is supplied to the cylinder compartment 106b of the cylinder mechanism 106 which constitutes the pulley adjustment system D, the lefthand side plate 110b of the second radius variable pulley 110 is urged, by means of the spring 113a of the spring-type responsive mechanism 113, toward the right as seen in FIG. 19 so that the effective radius of the second radius variable pulley 110 is enlarged while the effective radius of the first radius variable pulley 105 is reduced.

As a result, the speed change ratio of the pulley mechanism P is increased so as to drive the driven shaft 112 at a significantly-lowered revolutionary speed.

When feeding the hydraulic fluid to the cylinder compartment 106b of the cylinder mechanism 106 which constitutes the pulley adjustment system D, the righthand side plate 105a of the first radius variable pulley 105 is urged toward the left as seen in FIG. 19 so that the effective radius of the first radius variable pulley 105 is enlarged and at the same time, the effective radius of the second radius variable pulley 110 is reduced.

As a result, the speed change ratio of the pulley mechanism P is reduced so as to drive the driven shaft 112 at an increased revolutionary speed.

Here, detection results are input to the controller 6' from the above-described clutch switch, not shown, instead of the inhibitor switch 24 (see, FIG. 5). In Step a1' of FIG. 6 or FIG. 7, information concerning the on-off or engagement-disengagement state of the clutch is input in place of information concerning the gear positions. Thereafter, a judgment is made in Step a11 so as to determine whether or not the clutch is engaged. When the clutch is engaged, the processing moves to Step a3. When the clutch is not engaged, the processing advances to Step a12.

Figure 17:
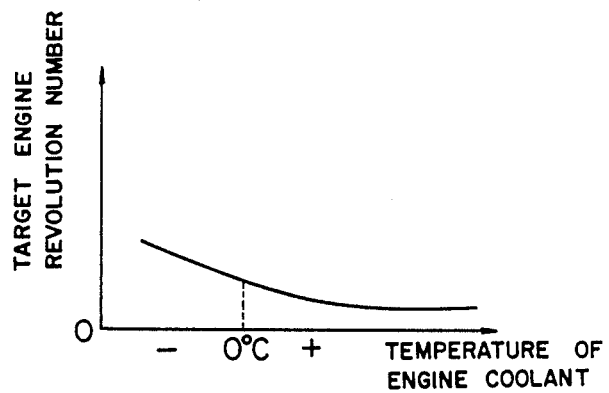
FIGS. 17 and 18 are diagrams showing various feedback target values as a function of operational conditions of an engine (that is, engine coolant temperature)
Figure 18:
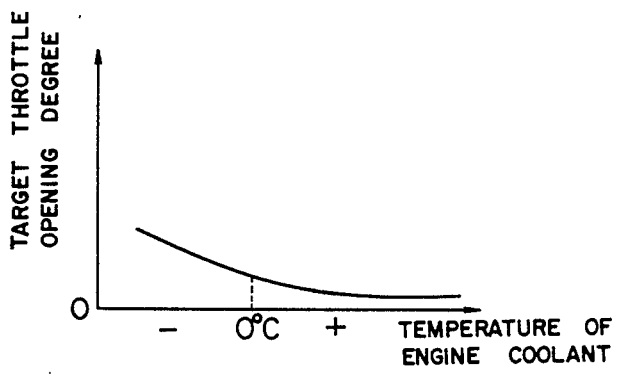

In each of the third and fourth embodiments, the control device is designed to determine the engine speed or the degree to which the throttle valve is open corresponding to the accelerator pedal depression degree x in Steps a12 and a13 when the disengagement in operation between the vehicle and the engine is detected. This design may be modified in such a way that as illustrated in FIG. 6 and FIG. 7, a target engine revolution number or target throttle opening degree which is independent from the above-described accelerator pedal depression degree is set in accordance with operational conditions of the engine (for example, the engine coolant temperature) in Step a14 (see FIGS. 17 or 18), the target value set in Step a14 is compared with the actual engine speed or the degree to which the throttle is open so as to determine a driving degree $\Delta D$ of the throttle value which is required to bring the actual value into conformity with the target value in Step a18, and a signal corresponding to the driving degree is output as another signal to the electric motor 5. In this case, the above-mentioned target engine revolution number or target throttle valve opening degree may preferably be of such a level that the lowest engine speed not causing an engine stall is obtained (this lowest engine speed value varies in accordance with operational conditions such as, for example, engine temperature). The gas mileage can be improved by setting the target engine revolution number or target throttle valve opening degree in the above-described manner.

In each of the third and fourth embodiments, the control device is designed in such a way that when the shift position of the transmission is detected to be at the reverse position in Steps a15, b10 and b11, the acceleration for driving the vehicle in the rearward direction is set to control the rearward acceleration of the vehicle in the same manner as in the forward operation of the vehicle. The control device may alternatively be designed in such a way that the processing is advanced to Step a12 (or Step a14) as indicated by an alternate long and short dash line in FIG. 6 and FIG. 7 when the shift position of the transmission is detected to be in the reverse position in Steps a15, b10 and b11.

In each of the above-described first, second, third and fourth embodiments, the control device is equipped with the accelerator pedal 14a as the manually-operated member and the accelerator pedal depression degree sensor 14b as the operation degree detecting means. The control device may however be constructed in such a way that a hand-operated stick 25a, as seen in FIG. 1, is provided as the manually-operated member, a stick position sensor 25b, which outputs an operation position signal in accordance with the operative position of the stick 25a and is composed of a potentiometer or the like, is provided as the operation degree detecting means, and various target values led by the target acceleration of the vehicle (inclusive of the target engine revolution number or engine speed and the target throttle opening degree) are set in accordance with the operative position of the stick 25a.

Although the motor position sensor 7 is provided in each of the preceding embodiments, this motor position sensor 7 may be omitted if the control device is constructed in such a way that when a stepping motor is used as the actuator, an address capable of storing information on the current position (that is, actual position information) of the stepping motor as the number of steps from a reference position is provided in the RAM (a battery backup RAM being preferable if possible) of the controller 6 or 6', the number of pulses of a pulse signal fed to the stepping motor is counted by programmed processing, and the data of the address is then corrected by the counted value. That is, the the degree to which the throttle valve is opened can be feedback controlled by storing the positional information concerning a target opening degree for the throttle valve, as the target number of steps from the above-described reference position, in the RAM of the controller 6 or 6', storing the actual number of steps of the stepping motor from the above-described reference position, corresponding to the actual degree to which the throttle valve is opened in the above-mentioned RAM, comparing the target number of steps with the actual number of steps, feeding as many pulse signals to the stepping motor as is required by the difference in the number of steps between the target number of steps and the actual number of steps so as to make the actual number of steps equal to the target number of steps when the former and latter numbers do not coincide with each other, and correcting the data of the address of the RAM (in either the ascending or descending direction) by the number of the pulse signals fed. When a stepping motor is used as an actuator and information on the actual degree to which the throttle valve is opened is stored as the number of steps of the stepping motor in the RAM of the controller 6 or 6' in the above-described manner, the throttle valve can be precisely controlled to an intended position by adding a driving degree $\Delta D$ of the throttle valve, which has been obtained in Step a4, a5, a7, b9 or the like, in the form of a step number to the current target opening degree.

In each of the above embodiments, the driving degree $\Delta D$ of the throttle valve is set at 0 in Step a7 when the degree to which the accelerator pedal is depressed is equal to the preset position (which corresponds to the minimum depressed position of the accelerator pedal in the first and third embodiments and to a position near the midpoint of the overall stroke of the accelerator pedal in the second and fourth embodiments). In order to achieve constant-speed operation of the vehicle when taking into consideration the sloped condition of a road surface or the like, it may be possible to design the control device in each of the above embodiments in such a way that Step a19 is provided in place of Step a7 (as a step bypassing Step a7) in each of FIGS. 2, 4, 6 and 7, the actual acceleration $\alpha_c$ is compared with the target acceleration o, the driving degree $\Delta D$ of the throttle valve is determined based on the comparison results (difference) of the actual and target acceleration values, and the thus-determined driving degree $\Delta D$ is output to the throttle value actuator in Step a6.

In order to achieve constant-speed operation of the vehicle while taking into consideration the sloped condition of a road surface or the like, it may also be possible to design the control device in each of the above embodiments in such a way that Steps a20, a21 and a22 are provided in place of Step a19 (as steps bypassing Step a7) in each of FIGS. 2, 4, 6 and 7. In this case, a judgment is initially made in Step a20 so as to determine whether or not the accelerator pedal has exceeded its preset position. When so judged, the current vehicle speed is input as a target vehicle speed Vs in the address of the RAM in Step a21. After the target vehicle speed is set in Step a21, the processing proceeds to Step a23. If a judgment is made in Step a20 that the accelerator pedal has not exceeded its preset position, or in other words, when it is judged that the accelerator pedal has been continuously maintained at the preset position, the processing advances to Step a22. In Step a22, a judgment is made to determine whether the brake pedal has been or is being operated. When the brake pedal is judged to be operated, the processing moves to Step a21 in which the target vehicle speed is re-evaluated. On the other hand, when the brake pedal is judged to be inoperative, a re-evaluation of the target vehicle speed is not performed. In other words, when the target vehicle speed, which is set immediately after the accelerator pedal has assumed the preset position, is maintained when the accelerator pedal assumes the preset position and the brake pedal is not operated, or when the target vehicle speed, which is set upon completion or termination of the operation of the brake pedal when the accelerator pedal assumes the preset position and the brake pedal has in fact been operated, the processing advances to Step a23. In Step a23, the current actual vehicle speed is compared with the data (concerning target vehicle speed Vs) in the address of the RAM and based on the comparison results (that is, the difference), the driving degree $\Delta D$ of the throttle valve is determined. A signal corresponding to the driving degree $\Delta D$ of the throttle valve determined in Step a23 is then output to the throttle valve actuator in Step a6. Accordingly, when the accelerator pedal is held at the preset position and the brake pedal in not operated, the speed of the vehicle is continuously maintained at the speed achieved immediately after the accelerator pedal had assumed the preset position. That is, the vehicle is allowed to undergo constant-speed operation at the vehicle speed achieved at the moment the accelerator pedal has moved to the preset position. When, on the other hand, the brake pedal is operated during this constant-speed operation, constant-speed operation is performed at the vehicle speed achieved upon completion or termination of the operation of the brake pedal.

It is noted that a differential-pressure responsive diaphragm may also be employed as an actuator in each of the above embodiments.

In each of the above-described embodiments, the acceleration sensor 21 is provided as the acceleration detecting means for detecting each operative acceleration of the vehicle. When detecting the operative acceleration of the vehicle, it may be possible to determine the rate of change (differential) of the vehicle speed information, which is to be input into the controller 6(6'), by suitable processing and to then obtain information on the operative acceleration of the vehicle from the results of this processing.

As has been described in detail, the vehicle engine control device of this invention can bring about the following effects or merits:

(1) When a vehicle is operating, its acceleration is facilitated, its drivability is improved, and the operative speed of the vehicle can be maintained with ease.

(2) The degree to which the throttle is opened can be correlated to the acceleration of the vehicle, whereby acceleration corresponding to the degree to which the accelerator pedal is depressed can be obtained.

(3) Constant-speed running or operation of the vehicle can be achieved with ease and the change to constant-speed running or operation of the vehicle can be facilitated.

Having now fully described the invention, it will be apparent to one of ordinary skill in the art that many changes and modifications can be made thereto without departing from the spirit or scope of the invention as set forth herein.

We claim:

1. In combination with an engine adapted to be mounted upon a vehicle in order to output power for driving said vehicle, said engine including a throttle valve disposed within an intake passage of said engine, and an actuator for driving said throttle valve by means of a manually-operated member so as to control the degree to which said throttle valve is opened and hence the output of said engine, a control system for said throttle valve, comprising:

operation-degree detecting means for detecting the degree of each operation of said manually-operated member;

target acceleration setting means for receiving detection results from said operation-degree detecting means and for generating a target acceleration signal corresponding to said degree of operation of said manually-operated member;

acceleration detecting means for detecting each operative acceleration of said vehicle; and control signal outputting means for comparing said target acceleration signal, which has been generated from said target acceleration setting means, with detection results received from said acceleration detecting means, and for subsequently outputting a control signal to said actuator so as to control said degree to which said throttle valve is opened in such a way that said operative acceleration of said vehicle is controlled to said target acceleration.

2. The control system as claimed in claim 1, further comprising:

power transmission control means provided in a power transmission system between said vehicle and said engine and adapted to control the operation of said power transmission system so as to obtain a first operation mode in which vehicle-driving power is transmitted from said engine to said vehicle, and a second operation mode in which vehicle-driving power is not transmitted from said engine to said vehicle;

operation-state detecting means for detecting the state of operation of said power transmission control means;

another signal outputting means for outputting another signal, which is independent of said control signal, to said actuator so as to control the degree to which said throttle valve is opened; and control means for operating said actuator by said output control signal from said control signal outputting means when said first control mode is obtained and for operating said actuator by said another output signal from said another signal outputting means when said second control mode is obtained, based on said detection results of said operation-state detecting means.

3. The control system as claimed in claim 2, wherein said another signal outputting means is designed, upon reception of said detection results from said operation-degree detecting means, to generate said another signal corresponding to said degree of operation of said manually-operated member and to output said another signal to said actuator.

4. The control system as claimed in claim 3, further comprising:

opening-degree detecting means for detecting said degree to which said throttle valve is opened; and target throttle opening degree setting means for receiving said detection results from said opening-degree detecting means and generating a target throttle opening degree signal corresponding to said degree of operation of said manually-operated member;

whereby said another signal outputting means compares said target throttle opening degree signal, which has been output from said target throttle opening degree setting means, with said detection results from said opening-degree detecting means and outputs said another signal to said actuator so as to control said opening degree of said throttle valve to correspond to said target throttle opening degree.

5. The control system as claimed in claim 3, wherein said control system comprises:

target throttle opening degree setting means for receiving said detection results from said operation-degree detecting means and generating a target throttle opening degree signal corresponding to said degree of operation of said manually-operated member, said target throttle opening degree setting means is designed to output said target throttle opening degree signal in the form of a target number of steps from a reference valve, said actuator is constructed of a stepping motor, an up-down counter means for counting the number of pulses to be fed to said stepping motor so as to retain information concerning said corresponding opening degree of said throttle valve in the form of an actual number of steps from said reference value, said control signal outputting means is designed to output a pulse signal as said control signal to said stepping motor, and said another signal outputting means is designed to compare said target number of steps generated from said target throttle opening degree setting means with said actual number of steps retained by said up-down counter means and to then output another pulse signal as said another signal to said stepping motor so as to bring said target number of steps and said actual number of steps into coincidence.

6. The control system as claimed in claim 3, wherein said control system further comprises:

revolution number detecting means for detecting the number of revolutions of said engine;

target revolution number setting means for receiving said detection results from said operation-degree detecting means and generating a target engine revolution number signal corresponding to said degree of operation of said manually-operated member, and said aother signal outputting means is designed to compare said target engine revolution number signal generated from said target revolution number setting means with said detection results from said revolution number detecting means and to then output said another signal to said actuator so as to control the speed of said engine in accordance with said target engine revolution number.

7. The control system as claimed in claim 2, wherein said control system comprises:

revolution number detecting means for detecting the number of revolutions of said engine;

target revolution number setting means for generating a target engine revolution number signal independently of said degree of operation of said manually-operated member, and said another signal outputting means is designed to compare said target engine revolution number signal generated from said target revolution number setting means with said detection results from said revolution number detecting means and to then output said another signal to said actuator so as to control the speed of said engine in accordance with said target engine revolution number.

8. The control system as claimed in claim 2, wherein said control system comprises:

target throttle opening degree setting means for generating a target throttle opening degree signal independently of said degree of operation of said manually-operated member, and said another signal generating means is designed to compare said target throttle opening degree signal, which has been generated from said target throttle opening degree setting means, with an actual throttle opening degree value and to then output said another signal to said actuator so as to control said actual throttle opening degree in accordance with said target throttle opening degree.

9. The control system as claimed in claim 2, wherein said power transmission control means comprises a clutch and the operation-state detecting means comprises a clutch switch adapted to detect the on-off, engaged-disengaged, state of the clutch.

10. The control system as claimed in claim 9, wherein said control system comprises: clutch control means for controlling said on-off, engaged-disengaged, state of said clutch in accordance with at least either one of said operational conditions of said vehicle and said operational conditions of said engine, and a continuously variable transmission, the speed change ratio of which is controlled in accordance with at least either one of said operational conditions of the vehicle and said operational conditions of said engine, is interposed in the power transmission system.

11. The control device as claimed in claim 2, wherein said power transmission control means comprises a transmission with a stepped gear ratio which comprises at least one vehicle movement shift position and a neutral position, and said operation-state detecting means detects whether the shift position of the stepped gear-ratio transmission is at said vehicle movement shift position or said neutral position.

12. The control system as claimed in claim 11, wherein said stepped gear-ratio transmission comprises:
an automatic transmission the shift position of which is controlled in accordance with at least either one of said operational conditions of said vehicle and said operational conditions of said engine, and
said operation-state detecting means comprises an inhibitor switch for permitting operation of a starter only when said transmission is disposed in said neutral position.

13. The control system as claimed in claim 2, wherein said power transmission system comprises:
a transmission capable of switching the moving direction of said vehicle to either forward or reverse;
reverse shift position detecting means for detecting that said shift position of said transmission is in said reverse position, and
reverse-mode controlling means for operating said another signal outputting means in preference to said control signal outputting means so as to feed said another signal to said actuator when said reverse shift position detecting means detects that said shift position of said transmission is in said reverse position.

14. The control system as claimed in claim 2, wherein said power transmission system comprises:
a transmission capable of switching the moving direction of said vehicle to either forward or reverse;
reverse shift position detecting means for detecting that said shift position of said transmission is in said reverse position, and
target acceleration switching means for switching said target acceleration set by said target acceleration setting means to either forward-operation target acceleration or reverse-operation target acceleration in accordance with said detection results from said reverse shift position detecting means.

15. The control system as claimed in claim 1, wherein said manually-operated member comprises an accelerator pedal provided near the driver's seat of said vehicle, said accelerator pedal is displaceable between a minimum depressed position and a maximum depressed position, and said target acceleration set by said target acceleration setting means is set in such a way that said target acceleration undergoes a monotonic increase in proportion to said degree of depression of said accelerator pedal and takes a positive value when said accelerator pedal has been depressed beyond a preset position.

16. The control system as claimed in claim 15, wherein said control system comprises:
brake operation detecting means for detecting the operation of a brake-operating member for operating the brakes of said vehicle; and
braking-mode signal outputting means for outputting a braking-time signal to said actuator in preference to said control signal outputting means so as to control the degree to which said throttle valve is opened when said brake operation detecting means detects that said brake-operating member is in operation and said minimum depressed position corresponds to said preset position.

17. The control system as claimed in claim 15, wherein:
an intermediate position between said minimum depressed position and said maximum depressed position corresponds to said preset position, and
when said depressed position of said accelerator pedal is between said minimum depressed position and said intermediate position, said target acceleration is set to be negative.

18. The control system as claimed in claim 15, wherein said target acceleration setting means sets said target acceleration at zero when said accelerator pedal assumes said preset position.

19. The control system as claimed in claim 15, wherein said control system comprises:
throttle valve opening degree fixing means which is operated in preference to said control signal outputting means so as to fix the degree to which said throttle valve is opened when said accelerator pedal assumes said preset position.

20. The control system as claimed in claim 15, wherein said control system comprises:
constant-speed operation instructing means for receiving the actual operation speed of said vehicle and a target operation speed, and for outputting a constant-speed operation command signal to said actuator so as to bring said actual operation speed into coincidence with said target operation speed, and
when said accelerator pedal assumes said preset position, said constant-speed operation instructing means is operated in preference to said control signal outputting means so as to allow said vehicle to run at a constant speed.

21. The control system as claimed in claim 20, wherein said actual vehicle operation speed upon displacement of said accelerator pedal to said preset position is input as said target operation speed in said constant-speed operation instructing means.

* * * * *